United States Patent
Saund et al.

(10) Patent No.: US 7,136,082 B2
(45) Date of Patent: Nov. 14, 2006

(54) METHOD AND APPARATUS TO CONVERT DIGITAL INK IMAGES FOR USE IN A STRUCTURED TEXT/GRAPHICS EDITOR

(75) Inventors: Eric Saund, San Carlos, CA (US); Thomas P. Moran, Palo Alto, CA (US); Daniel Larner, San Jose, CA (US); James V. Mahoney, Palo Alto, CA (US); Todd A. Cass, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 163 days.

(21) Appl. No.: 10/056,562

(22) Filed: Jan. 25, 2002

(65) Prior Publication Data
US 2003/0142112 A1    Jul. 31, 2003

(51) Int. Cl.
G09G 5/00    (2006.01)
(52) U.S. Cl. ...................................... 345/619
(58) Field of Classification Search ............... 345/619, 345/732
See application file for complete search history.

(56) References Cited

U.S. PATENT DOCUMENTS

| | | |
|---|---|---|
| 5,041,992 A | 8/1991 | Cunningham et al. |
| 5,255,354 A | 10/1993 | Mahoney |
| 5,486,686 A | 1/1996 | Zdybel, Jr. et al. |
| 5,491,760 A | 2/1996 | Withgott et al. |
| 5,537,491 A | 7/1996 | Mahoney et al. |
| 5,544,267 A | 8/1996 | Mahoney et al. |
| 5,563,991 A | 10/1996 | Mahoney |
| 5,659,639 A | 8/1997 | Mahoney et al. |
| 5,734,761 A | 3/1998 | Bagley |
| 5,825,944 A | 10/1998 | Wang |
| 5,874,966 A | 2/1999 | Polimeni et al. |
| 5,889,523 A * | 3/1999 | Wilcox et al. ............... 345/854 |
| 5,999,664 A | 12/1999 | Mahoney et al. |
| 6,005,973 A | 12/1999 | Seybold et al. |
| 6,009,196 A | 12/1999 | Mahoney |
| 6,020,972 A | 2/2000 | Mahoney et al. |
| 6,377,710 B1 | 4/2002 | Saund |
| 6,389,435 B1 * | 5/2002 | Golovchinsky et al. ...... 715/512 |
| 6,411,733 B1 | 6/2002 | Saund |
| 6,470,095 B1 * | 10/2002 | Mahoney et al. ........... 382/199 |
| 6,678,397 B1 | 1/2004 | Ohmori et al. |
| 2003/0001851 A1 | 1/2003 | Bushey |
| 2003/0007018 A1 * | 1/2003 | Seni et al. ................... 345/864 |
| 2003/0069931 A1 | 4/2003 | Omura et al. |
| 2004/0257367 A1 | 12/2004 | Smith et al. |

FOREIGN PATENT DOCUMENTS

EP    0 549 329 A2    6/1993

(Continued)

OTHER PUBLICATIONS

Wayback Machine, Pocket PowerPoint Editor, Mar. 22, 1999, [online]. [retrieved Feb. 2, 2005]. Retrieved from internet:<http://www.archive.org/details/tucows_32603_Pocket_PowerPoint_Editor>.*

(Continued)

Primary Examiner—Kee M. Tung
Assistant Examiner—G. F. Cunningham
(74) Attorney, Agent, or Firm—Fay, Sharpe, Fagan, Minnich & McKee, LLP

(57) ABSTRACT

In accordance with one aspect of the present invention, disclosed is an image analysis and conversion method and system, where digital ink images are converted to structured object representations of the digital ink images, capable of being edited by a structured text/graphics editor.

20 Claims, 16 Drawing Sheets

FOREIGN PATENT DOCUMENTS

| EP | 0582490 A | 2/1994 |
|---|---|---|
| EP | 690415 A | 1/1996 |
| WO | WO01/57786 A | 8/2001 |

OTHER PUBLICATIONS

Microsoft, Microsoft Paint Tutorial, [online], 2001, [retrieved on Sep. 14, 2005]. Retrieved from the internet:<URL:http://www.lesley.edu/faculty/ahunt/MSPttutr.htm>.*

Microsoft, MS Word, 2000, Microsoft, pages immbedded in office action document.*

Moin, Shahram et al. "Structure Recognition of On-Line Handwritten Documents Based on SGML"; Proceedings of the 4th International Conference on Document and Recognition, Ulm Germany, Aug. 18-20, 1997, Proceedings of the ICDAR, Los Alamitos, IEEE Comp. SOC, US, vol. II Aug. 18, 1997, pp. 649-652, XP010244806; ISBN: 0-8186-7898-4.

European Search Report, Application No. EP 03 00 2004; Dated Mar. 17, 2005, Examiner A. Turina, Munich Germany.

Microsoft, Microsoft Paint, 1998, Microsoft Corp.; pertinent pages, Figure 1, Figure 2, Figure 3.

European Search Report dated Mar. 15, 2006; European Appl. No. EP03002003.

Saund, Eric; (2001); *Finding Perceptually Salient Closed Paths in Sketches and Drawings* POCV 2001; The Third Workshop on Perceptial Organization in Computer Vision, CIS Report No. CIS (May 2001); Center for Intelligent Systems, Technion, Israel (2001).

* cited by examiner

METHOD AND APPARATUS TO CONVERT DIGITAL INK IMAGES FOR USE IN A STRUCTURED TEXT/GRAPHICS EDITOR

BACKGROUND OF THE INVENTION

This invention relates to a method and apparatus for processing images, and more particularly to an image analysis system that takes as an input, bitmapped and/or digital ink images, and outputs structured object representations which can be used within a structured text/graphics editor.

While the invention is particularly directed to the art of image processing and analysis, and will be thus described with specific reference thereto, it is to be appreciated the invention may have usefulness in other fields and applications.

Electronic communication has become the standard in many fields, replacing and/or enhancing previous modes of communication. For example, in business, education, scientific and other forms of communication the use of electronic slide presentations has become nearly ubiquitous. These electronic slide presentations are commonly created through the use of structured text/graphics editor programs. Though not limited to, examples of such editors include Microsoft Powerpoint, Corel Draw, MacDraw, and Frame. These programs offer editing capabilities for both text and graphic material. Among the text editing capabilities are the control of fonts, columnar layout structures, list indentation, bullet points, and font color, among others. Graphic editing capabilities include menus of generic shapes, freeform and spline drawing, snapping to grids, resizing, parameterized reshaping, boundary lines and fill color control, as well as positioning of text blocks within graphic objects, among others. In addition, these structured text/graphics editors include the ability to import bitmap images, which are treated as picture objects that can be positioned, scaled and cropped.

While the structured text/graphics editors described have met with significant commercial success and usage, existing implementations have limitations. Particularly, existing structured text/graphics editors require the creation and editing of material to take place within the system via manual operations. Due to these limitations existing text/graphics editors are not able to meet the demands of workers employing different modes of work, such as working with physical documents, i.e., generating sketches by paper and pen. More particularly, the described computer-based text/graphic editing tools do not have an easy usable interface with physical document media.

For example, a common process for generating an electronic slide presentation using structured text/graphic editors begins with the drafting of presentation slides on a physical surface away from constraints of interacting with a computer. In one instance, an individual may make sketches on a pad of paper using pen and pencil, or a group may be cooperatively creating concepts on a whiteboard. Only after this initial process will someone be appointed to convert the handwritten material into structured text/graphic formats using the computer-based editors.

Alternatively, the entire presentation may be composed from scratch within a structured text/graphics editor, foregoing any possible advantages of using a paper media, simply due to the fact that the final result is required to be in the computerized format.

If the initial creation is undertaken using hand-drawn images, the process for importing these images into a structured text/graphic editor can be a tedious and cumbersome process. While various editors have created shortcuts which permit the selection of specific preconfigured geometric shapes through click-and-drag programs, even these shortcuts can become tedious when a complex figure is involved. Also drawing a complex shape not offered as a preconfigured object can be more difficult than drawing it freehand. Further, with attention to the inputting of text, the typing of keystrokes is in and of itself not difficult. However, obtaining a desired layout, with indentations, bulleted and structured text blocks in desired positions involves a large number of mouse and keyboard operations to navigate menus, enter text, adjust positions and format parameters, and so forth.

While text and graphic recognition systems exist, these systems do not consider the text and/or graphics in such a way that a structured text/graphics editor may employ its full range of operations to the recognized text/graphics.

It has therefore been considered useful to develop a system which overcomes the above deficiencies and others to improve the usefulness of structured text/graphics editors.

SUMMARY OF THE INVENTION

In accordance with one aspect of the present invention, disclosed is an image analysis and conversion method and system, where a digital ink image is converted to structured object representations of the digital ink image, which may be read and edited by a structured text/graphics editor.

Advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENT

1. Overview of System Concepts, Design and Operation

Figure 1:
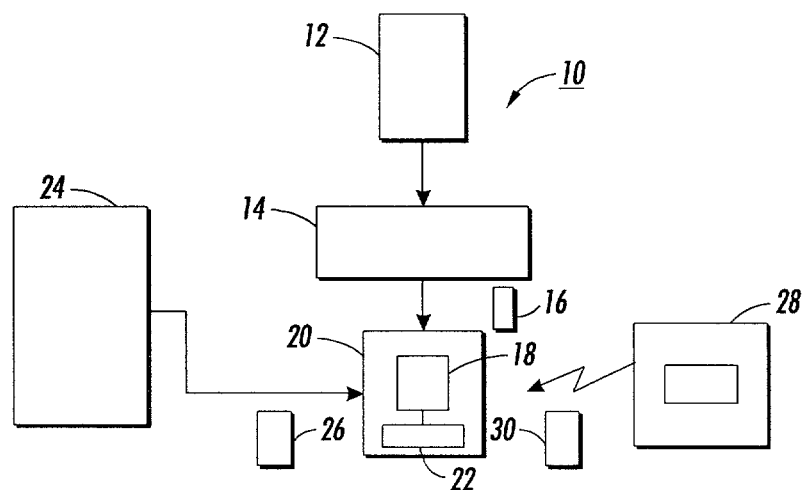
FIG. 1 is a system incorporating the concepts of the present invention.

Depicted in FIG. 1 is a system 10 in which the concepts of the present invention may be implemented. System 10 illustrates various channels by which bitmapped (i.e., rasterized) and/or images formed by digital ink techniques (i.e., a vector representation) images are provided to a converter of the present application. The bitmapped images are a stable intermediate point at which the converter process according to the present application would be invoked. It is to be appreciated, the conversion process may also be invoked upon the input of digital ink images.

More particularly, images on a hand-written page 12 are input to a scanner 14 which converts the images on page 12 into electronic bitmapped images 16 (which under existing structured graphics editors is treated as a picture object). Images on page 12 may be created by pens, pencils, or other non-electronic materials. Bitmapped image 16 is displayed on a screen 18 of a computer, personal digital system or other electronic device 20, which includes a converter system 22 of the present application.

Alternatively, a whiteboard or digital ink device 24 may be coupled to electronic device 20, whereby bitmapped or digital ink images 26 are electronically transmitted to device 20. Another channel by which bitmapped or digital ink images may be provided to the converter system 22, is through use of another electronic device 28. This device can be any of a number of systems, including but not limited to a computer having a structured text/graphics editor, a computerized CAD system, a server on the Internet which delivers web pages, or any other system which an electronic tablet, personal digital assistant+(PDA), provides bitmapped and/or digital ink images 30 to converter system 22. Further, image generation software, loaded on electronic device 20, can be used to generate a bitmapped or digital ink image for use by converter system 22.

It is to be appreciated that while the foregoing discussion explicitly states a variety of channels to generate the images, concepts of the present application will also work with bitmapped and/or digital ink images obtained through other channels as well.

An embodiment of the present invention is directed, therefore, to receiving bitmapped and/or digital ink images, generated by a variety of procedures, and converting the images into structured object representations of the images. By this process the bitmapped and/or digital ink images are defined in accordance with symbols (i.e., the structured object representations). Thus, operation of converter 22 does not convert the bitmapped and/or digital ink images into online images, but rather converts the images into representations of the images. While the representations may be viewed as images, they are primarily symbolic representations.

The present process permits manipulations not possible when an image is in a non-converted bitmapped and/or digital ink format. By conversion to structured object representations, it is possible to deal with distinct areas of the converted image. Such distinct areas may be considered to be perceptually salient areas.

Perceptually salient areas are those areas of an image that ordinary viewers of graphic imagery, text, or mixtures of these, would readily identify in certain groupings and collections of image primitives (i.e., pixels) as being sensible, visibly apparent or meaningful units on which to perform image editing operations. These groupings may be based on any of a variety of properties, including but not limited to spatial proximity, curvilinear alignment, connectedness, colinearity, forming a closed path, being contained within a closed or mostly-closed figure, forming elementary geometry shapes or configurations, and combinations of these Thus, concepts of the present invention extend existing image conversion beyond the ability to simply import a scanned image as a picture object, where the picture object is a scanned bitmap consisting of an undifferentiated array of pixels or a vector representation. When such picture objects are put into an existing structured text/graphics editor, rudimentary editing operations may be performed on the entire picture object.

Figure 2A:
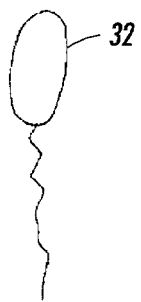
FIG. 2A is represents a hand-sketched image.
Figure 2B:
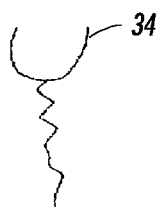
FIG. 2B depicts a hand-sketched image imported as a picture object into a structured text/graphics editing system and modified according to available bitmap modification operations, such as stretching and cropping.

This concept is more particularly detailed by a review of FIGS. 2A–2B. FIG. 2A represents a hand-drawn original non-electronic sketch 32. FIG. 2B illustrates editing operations (i.e., scaling, cropping, color tone adjustment) which may be performed on the entire picture object 34. FIG. 2B shows results after applying a number of these editing operations to the hand-drawn figure of FIG. 2A. In this particular situation, the hand-drawn sketch has been imported into a text/graphics editor, then scaled and cropped.

Figure 2C:
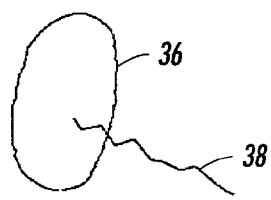
FIG. 2C depicts a sketched image input to a structured text/graphics editing system in accordance with the concepts of the present invention showing distinct and individually manipulatable picture objects.

However, and as will be emphasized by FIG. 2C, existing text/graphics editors fail to provide access to perceptually salient areas within the bitmap. In FIG. 2C, two perceptually salient structures of the picture, a circle 36 and a tail 38 are modified independently from one another. These operations have been achieved in an actual system implementation using concepts of the present invention. However, with existing text/graphic editors it is not possible to take bitmapped images, import them into existing test/graphics editors, and perform editing on automatically defined individual perceptually salient structures. Rather, editing of these bitmapped images are limited to basic editing of the overall picture object as depicted in FIG. 2B. Similar shortcomings exist for the discussed digital ink images.

The ability to treat perceptually distinct image entities as independent editable text/graphic objects permits users to perform meaningful text and graphic editing operations beyond those capable with existing systems.

2. Look and Feel of the Converter System

Embodiments of the present system provide the foregoing capabilities by first picking out primitive text and graphic elements and bitmap images, then assembling perceptually salient groupings of those elements. A concept of the present invention supports a class of look-and-feel techniques, along with supporting data structures and algorithms which make available to users multiple perceptual interpretations of imaged document material.

These multiple perceptual interpretations may be rendered to have "formal" and/or "informal" representations of graphical and textual material. "Formal" graphical material refers to geometrically precise or exact renditions of linework and shapes, while "informal" graphical material refers to approximate or geometrically imperfect figures that human observers nonetheless normally identify with their precise counterparts. For example, a rectangle drawn with mechanical drafting tools, or else rendered on a computer printer from a computer program that references geometrically precise coordinates, would be considered "formal", while a rectangle sketched by hand would be considered "informal." Similarly, text that has been typeset with mechanical printing equipment, or alternatively rendered through computer printing technology using designed fonts and layout algorithms would be considered "formal", while imprecisely handwritten text is considered "informal." These definitions allow for some imprecision whereby text or graphics could be considered either formal or informal, for example very carefully and precisely hand-drawn geometric shapes, very neat hand lettering, or computer fonts and layout algorithms designed to look casual and imprecise. This imprecision in no way limits the functionality, purpose, or usefulness of the concepts described herein.

A simple example of these concepts is shown in connection with FIGS. 3A–3H, which were generated by an actual system implementation. In this group of FIGURES, the source material or original hand sketch is FIG. 3A, which is a hand-drawn graphic consisting of four relatively straight strokes roughly forming a rectangular shape 40 which in turn encloses a set of hand-drawn characters forming a column of lines of text 42–46.

Figure 3A:
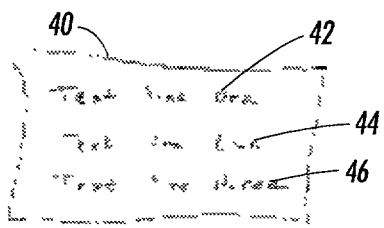
FIGS. 3A–3H show examples of hand-sketched materials and various interpretations of those materials obtainable through the implementation of concepts of the present invention in a graphics/text editing system.
Figure 3B:
Figure 3C:
Figure 3D:
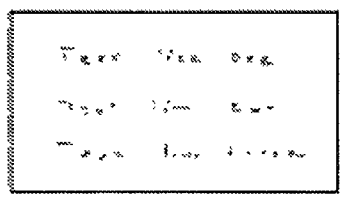
Figure 3E:
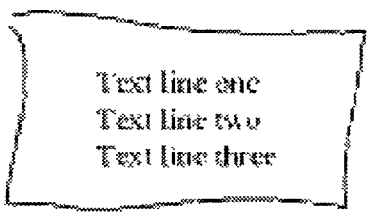
Figure 3F:
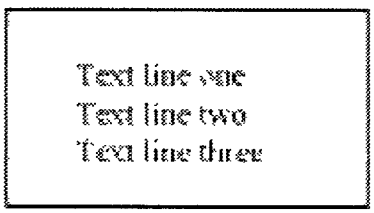
Figure 3G:
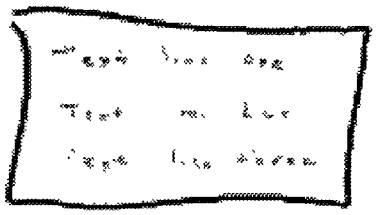
Figure 3H:
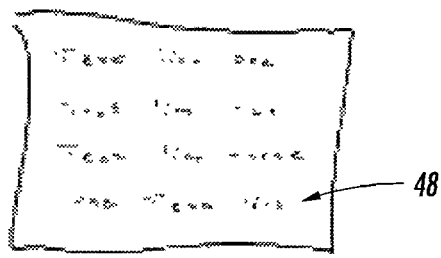

It is possible that a user may have any one of several intentions in importing this hand-drawn material into a structured graphics editor. FIGS. 3B–3H illustrate several entirely plausible intended outputs of such a user. These include, as shown in FIG. 3B, maintaining the handwritten material as is, but changing the dashing and line thickness of the hand-drawn rectangle 40. Alternatively, the user may wish to rearrange rows of the handwritten text as shown in FIG. 3C, or as shown in FIG. 3D, convert the graphic into a formal rectangle 40, while preserving the text 42–46 in its handwritten form. Another alternative shown in FIG. 3E is to convert the handwritten text 42–46 to formal type while preserving the handwritten graphic rectangle 40. Still further, as shown in FIG. 3F, the user may intend to convert both the text 42–46 and the graphic object (rectangle) 40 to formal text and graphic objects. Yet another possible output of the user is shown in FIG. 3G where the interior of the hand-drawn graphic 40 is provided with color. Finally, the user may wish to extend the handdrawn graphic 42–46 to include another text item 48.

Showing these possible alternative representations illustrates that the intent of a user (i.e., the person creating the initial hand-written sketch) may be varied and, therefore, benefits exist not only by incorporating a recognition capability in editing systems, but also in creating an option of providing users with alternative interpretations of the handwritten material. It is to be understood that in the foregoing discussion, FIG. 3A may originally be created as a digital ink image, and the conversion processes described herein will be used to convert the digital ink images into structured objects. Therefore, the representations shown in FIGS. 3B–3H may also be obtained based on an original digital ink image.

Figure 4A:
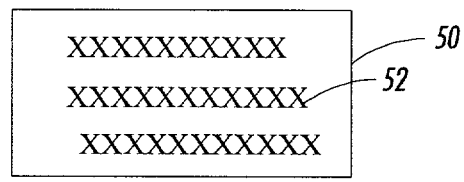
FIGS. 4A–4C illustrates various stages of replacing dummy characters with text characters.
Figure 4B:
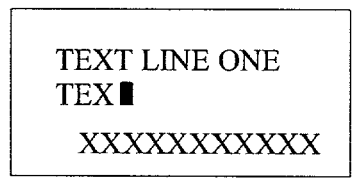
Figure 4C:
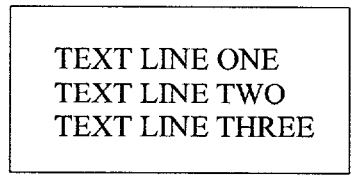

This system further also permits display of certain parameters of the text, such as layout, font, bullets and underlines, but where actual character identities are left open. More specifically, FIGS. 4A–4C illustrate this concept. Herein a user is presented with text layout as formal text boxes 50 filled with "dummy" content of "Xs" 52. This provides the user with an opportunity to select the dummy text and replace it with target characters by typing but without having to perform text object selection, positioning, formatting, etc. An option in the present system is for users to draw representations indicating blocks of textual material, but not written out in detail. Such actions are sometimes called "greeking", where these representations include series of parallel, straight or wavy lines drawn to define a region roughly corresponding to the placement of text material.

3. Presentations of Alternative Interpretations for Imaged Documents 3.1 Alternative Graph The look-and-feel of this system is accomplished in one embodiment through the construction of a data structure called an "Alternative Graph" which makes explicit multiple, possibly conflicting, possibly overlapping, perceptually significant visual objects implicit in a raw bitmap image. Technical processes to build Alternative Graphs are disclosed in Section 4.

Figure 5:
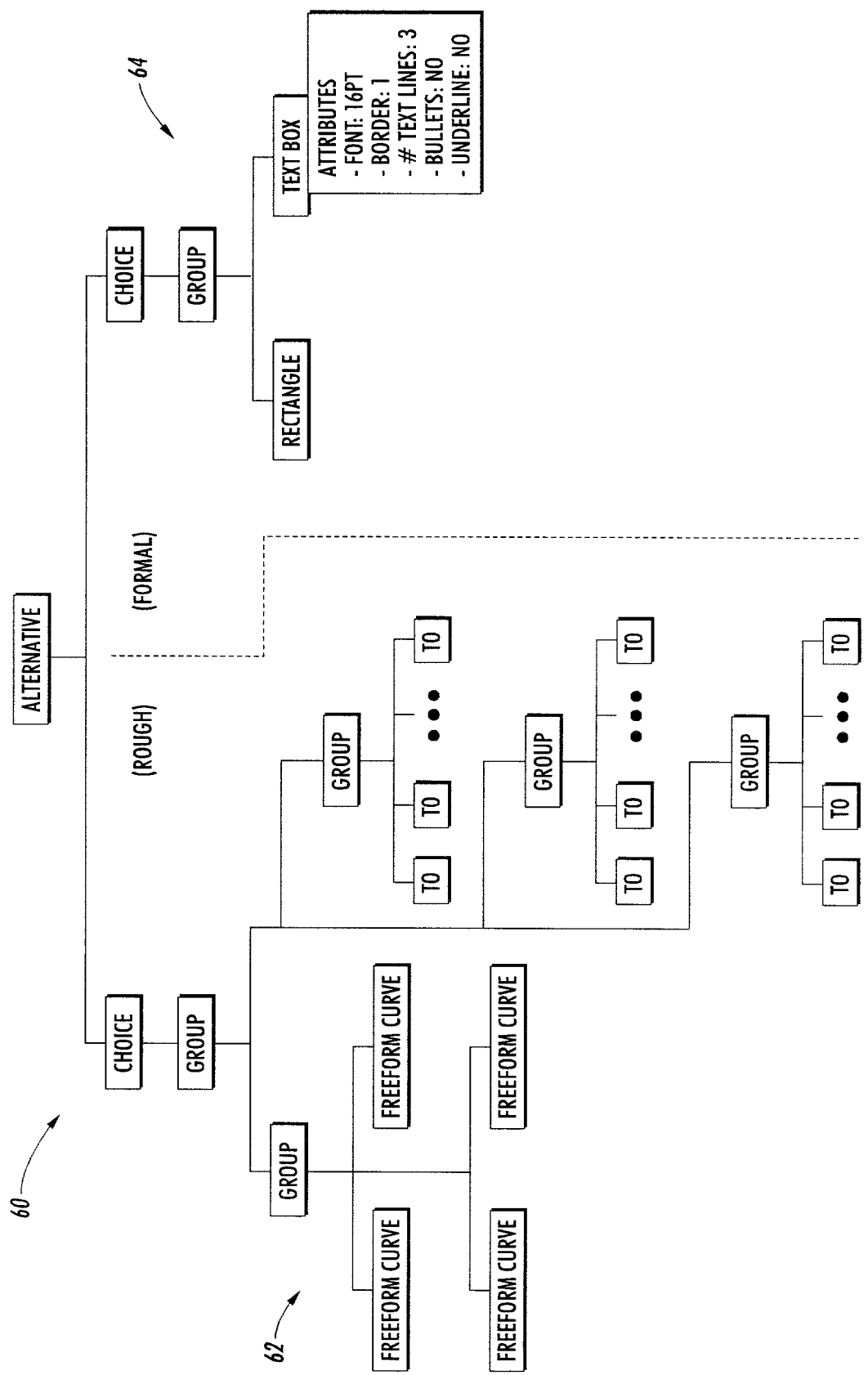
FIG. 5 sets forth an alternative graph which may be used in accordance with concepts of the present invention.

FIG. 5 shows one example of an Alternative Graph 60 for the example of FIGS. 3A–H. The left (rough) portion 62 of the graph structures material in a way that would be rendered as FIG. 3A. The right (formal) portion of the graph structures material to be presented as in FIG. 4A. Links in the Alternative Graph are directed and represent that connected boxes are part of the boxes to which they are connected, i.e., the links represent a "part-of" relation. The Alternative Graph contains four kinds of nodes:

1. OBJECT nodes, designated in FIG. 5 as (Text Object (TO), Freeform Curve, Rectangle, Text Box) nodes which correspond to graphic or textual objects that have direct counterparts in the structured text/graphics editor. These include characters, lines, arcs, freeform curves, rectangles, ellipses, polygons, and arrows. The letters "TO" denote a Text Object which could take form as either a freeform curve or a picture object.
2. GROUP nodes, which correspond to groups of objects. In structured text/graphic editors such as Powerpoint, MacDraw and others, objects that are bound together as a "Group" are treated as a single object with respect to operations such as select, move, resize, rotate, change depth layer, delete, etc. GROUP nodes declare a member list of objects belonging to the group. Groups can be nested hierarchically; in other words, a GROUP can be a member of another GROUP, in noncyclic fashion.
3. CHOICE nodes, denote the collection of objects or groups belonging together under each alternative.
4. ALTERNATIVE nodes, which represent the fact that some collection or region of image material, can be interpreted in multiple ways.

In general the definition of the Alternative Graph data structure permits ALTERNATIVE nodes (and child CHOICE nodes) to occur at multiple levels and to be nested within one another. Whether this general type of Alternative Graph is employed depends on the presentation mode and constraints of the target structured graphics editor. The Alternative Graph shown in FIG. 5 is configured with only a single ALTERNATIVE node at the root. This class of Alternative Graph is suited to presentation of alternative perceptual interpretations on multiple slides in structured graphics editors for which this is a convenient presentation mode, such as Powerpoint, MacDraw or others. This represents one preferred embodiment of the invention.

3.2. Presentation Modes

The Alternative Graph enables a family of presentation/ interaction modes for accessing various interpretations of perceptually salient image objects. Listed in sections 3.2.1–3.2.3 are three presentation/interaction modes that have been considered. It is to be understood that other modes may also be available under the teachings of the present concepts.

3.2.1. Multiple Slides

Under many circumstances, alternative interpretations of graphic or textual image material may be considered to reflect different degrees of formality. The representation of FIG. 3B appears as a roughly sketched shape enclosing handwritten characters. Within the structured text/graphics editors, this figure is structured as a Group of relatively straight freeform line objects, plus three groups of bitmap objects corresponding to the three text lines. This may be considered an informal representation.

An alternative, formal, representation of this perceptual entity is shown in FIG. 3F. Within the structured text/ graphics editors, this figure is structured as a Group whose members are a unitary graphic Rectangle object, and a Text Block containing three lines of text.

One option for presenting and providing user access to alternative interpretations is to place them on different presentation slides. For example, less formal alternatives inhabit a "rough" slide, while more formal alternatives inhabit a "formal" slide. Additional slides of intermediate degrees of formality are possible. Users wishing to construct images of mixed formality such as FIG. 3D are able to select and transfer objects and groups from a slide to slide. Additionally, under some structured text/graphics editors, special keystrokes, mouse, voice, or gesture commands are defined to swap selected objects between the slide they are on and the slide of an alternate formality.

Disclosed in Section 4 is a procedure for transforming an Alternative Graph representation of a document image into a set of registered slides. This depiction of the procedure exemplifies an organization of slides along the dimension of "formality."

3.2.2 Background Renditions

An intended use for a sketch-to-structured text/graphic editor application is to assist in converting handwritten text to typed text. This task decomposes into two issues: (1) ascertaining the layout structure of the original text, i.e., positioning, indentation and underlining of words, lines and columns of text, and (2) recognizing the actual characters comprising the text. In many cases adequate performance on issue (1) can be achieved independent of any solution to issue (2). The degree of difficulty in recognizing actual characters depends upon numerous issues including but not limited to the user's handwriting, choice of pen, scanner characteristics, etc. Thus FIG. 3F portrays an alternative "formal" interpretation for FIG. 4A, capturing the layout structure of the text as a formal text object, but substituting dummy characters for the actual character identities.

One utility of this incomplete formal alternative is that users have only to select and type in text content but would be relieved of the chore of creating and laying out the associated text block structures, yielding FIG. 3F or 4C.

This activity is facilitated by presentation techniques that permit the user to see original or informal interpretations while operating on formal interpretations.

Figure 6A:
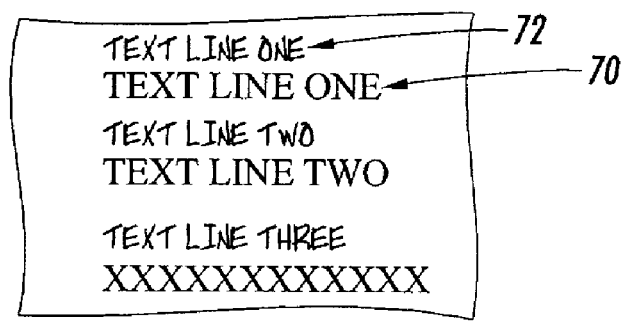
FIGS. 6A–6D depict various processes for displaying original or informal interpretations while operating on formal interpretations of images within structured text/graphics editor systems.

A process to accomplish the above is through the use of underlays, where the rendition of one alternative is made visible in the background on the slide of the foreground, operative alternative. A method for depicting the background material is through a separate imaging layer spatially registered with the foreground material. This reference imaging layer appears as an underlay or overlay with respect to the operative material. A variety of imaging models (i.e., alternative interpretations) can be used to generate the final presentation, including different color or shading, transparency/translucency, and defocus. This concept is illustrated by FIG. 6A, where formal text 70 is depicted in a transparent/translucent form, and the informal text 72 is depicted in regular lines.

Figure 6B:
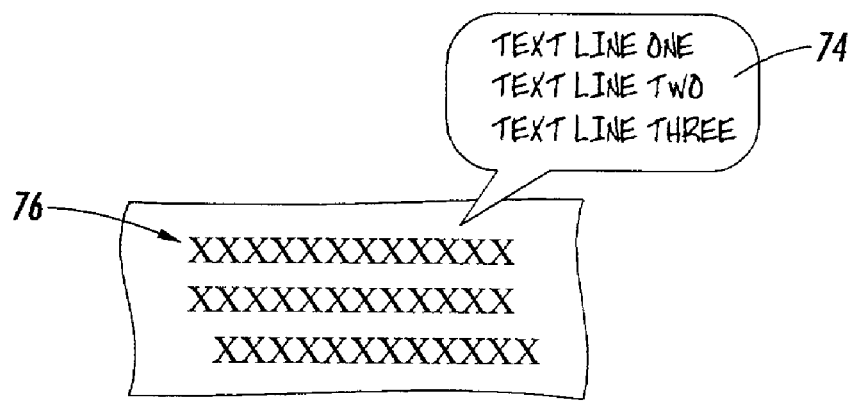

Another means, as shown in FIG. 6B, for simultaneously presenting alternative interpretations is through the use of shrunken and/or displaced image clips, in some embodiments being enclosed by bubbles or balloons 74 near drawing text 76.

3.2.3 Selection Among Choices

Figure 6C:
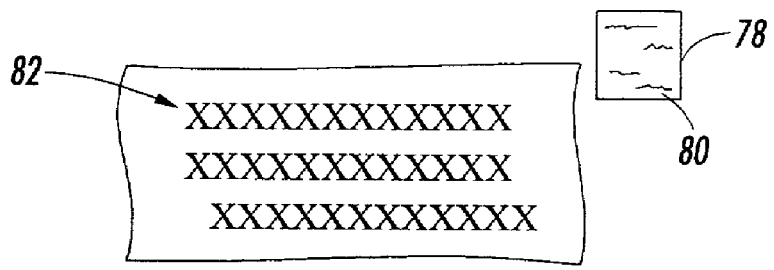
Figure 6D:
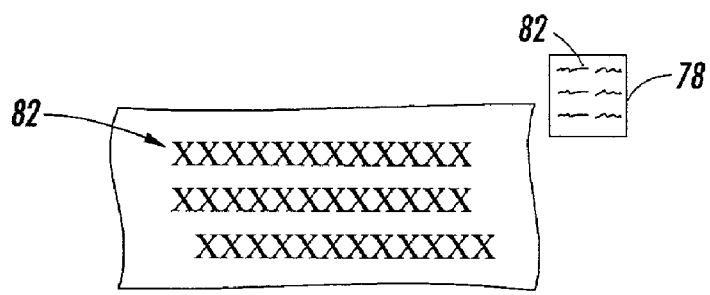

A third class of presentation/interaction modes for alternative interpretations of source material is direct presentation of alternatives, either simultaneously, such as in a pop-up window from which the user can select among choices, or through sequential cycling, in which case the presentation order can be adjusted according to estimates of user preference. For example, FIG. 6C shows a pop-up window 78 presenting a possible representation 80. Window 78 is shown open simultaneously with the text 82 in FIG. 6C. FIG. 6D shows the same text 82, however now window 78 is displaying another possible representation 84 of text 82. These figures illustrate the sequential cycling concept as well as simultaneous presentation.

4. Recognition of Alternative Interpretations for Text and Line Art

Disclosed in this section is an image analysis system design that accomplishes construction of an Alternative Graph (e.g., graph 60, FIG. 5) representing a plurality of interpretations for sketched or other bitmap source material. The Alternative Graph supports presentation/interaction modes for making available different perceptually valid interpretations of image data.

4.1. Recognition System Architecture

Figure 7:
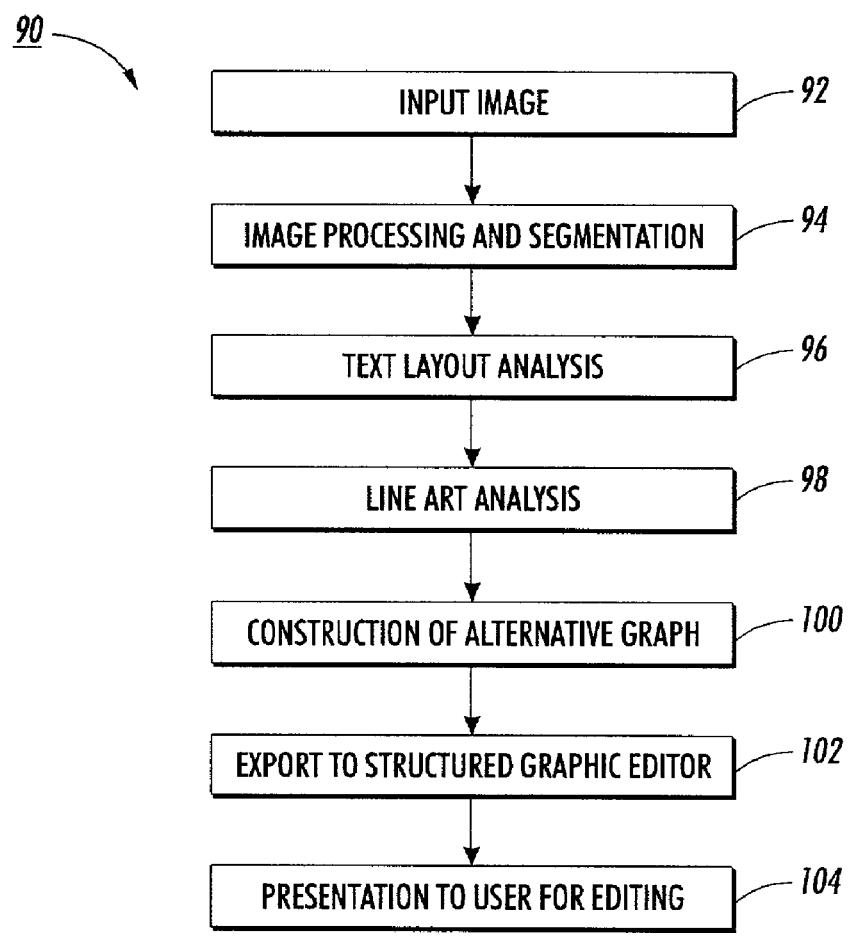
FIG. 7 provides a flow chart of an overall system design of an embodiment according to the present invention.

FIG. 7 shows an overall system design 90 for the processing of an input image 92. The major components and their functions include, 1. Image Processing and Segmentation module 94, which processes a scanned bitmap image (i.e., input image 92) in such a way as to separate three classes of primitive image objects: (1) small connected components at the scale of text characters; (2) relatively straight curvilinear line fragment uncomplicated by junctions, called "stroke-fragments"; and (3) large scale pictorial objects. An algorithm for performing this segmentation is disclosed in U.S. patent application Ser. No. 09/199,699, filed Nov. 25, 1998, Saund, E., "Method for Separating Document Image Object Types," hereby incorporated by reference.

2. Text Identification and Layout Analysis module 96 which identifies groupings of bitmap and stroke objects representing runs of characters forming text lines and columns. Under one aspect of this system, the result of this analysis is a list of text group structures, each containing two or more alternative interpretations of that text block. For example, one interpretation of a given text block may be a column of text lines organized in an indented list layout structure, while another interpretation may be a set of primitive image objects with no further internal structure. Concepts and operations of this module are discussed in more detail in Section 4.2

3. Line Art Analysis module 96, which identifies groupings of stroke objects. Under one aspect of this operation, the result of this analysis is a list of line art objects, each containing two or more alternative interpretations. Line art objects include open curvilinear paths and closed curvilinear paths, and other geometric entities such as arrowheads. For example, if a given closed curvilinear path forms a rectangular shape, then a rectangle model is listed as an alternative interpretation of the more general, closed path model. Concepts and operations of this module are discussed in more detail in section 3.3.

4. Construction of Alternative Graph module 100, which takes as input the lists of text and line art groups including alternative interpretations for each group, and constructs an Alternative Graph. Concepts and operations of this module are discussed in more detail in Section 3.4.

5. Export to Structured Graphics Editor module 102, which traverses the Alternative Graph and creates appropriate presentation slides with text and line art objects, plus a hierarchy of groups. Concepts and operations of this module are discussed in more detail in Section 3.5.

The output of modules 94–102 may then be presented to a user for editing purposes 104.

It is to be appreciated that when a system of the present application operates to convert digital ink images to structured objects, the procedure is slightly different than for received bitmapped images. Particularly, it is not necessary, in the Image Processing and Segmentation module 94 to process the digital ink image into three classes of primitive image objects, since the curvilinear stroke-fragments are obtained directly from the digital ink image.

4.2. Image Analysis to Detect Alternative Interpretations of Text Objects

Figure 8A:
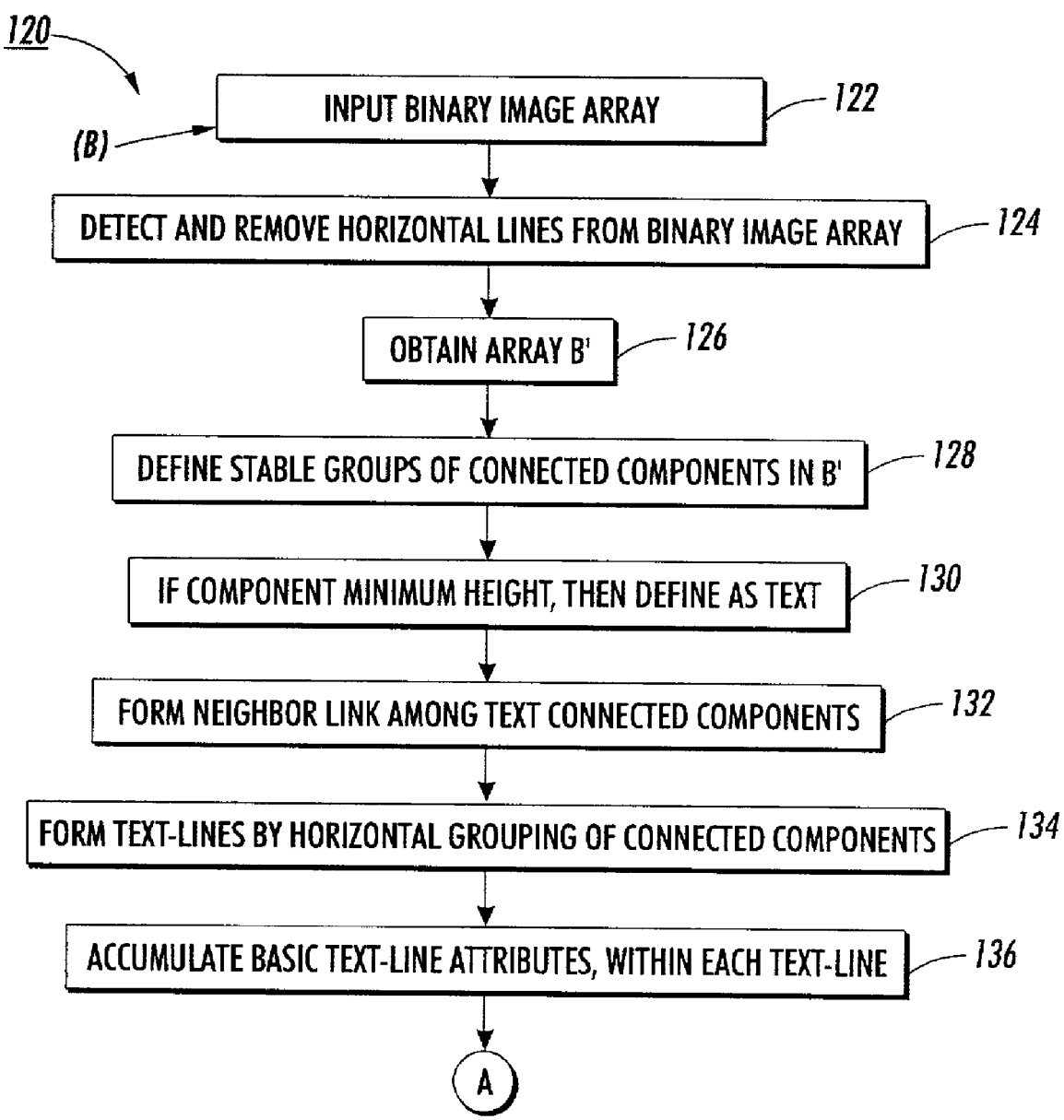
FIGS. 8A–8B set forth a flow diagram for image analysis in order to detect alternative interpretations of text objects.
Figure 8B:
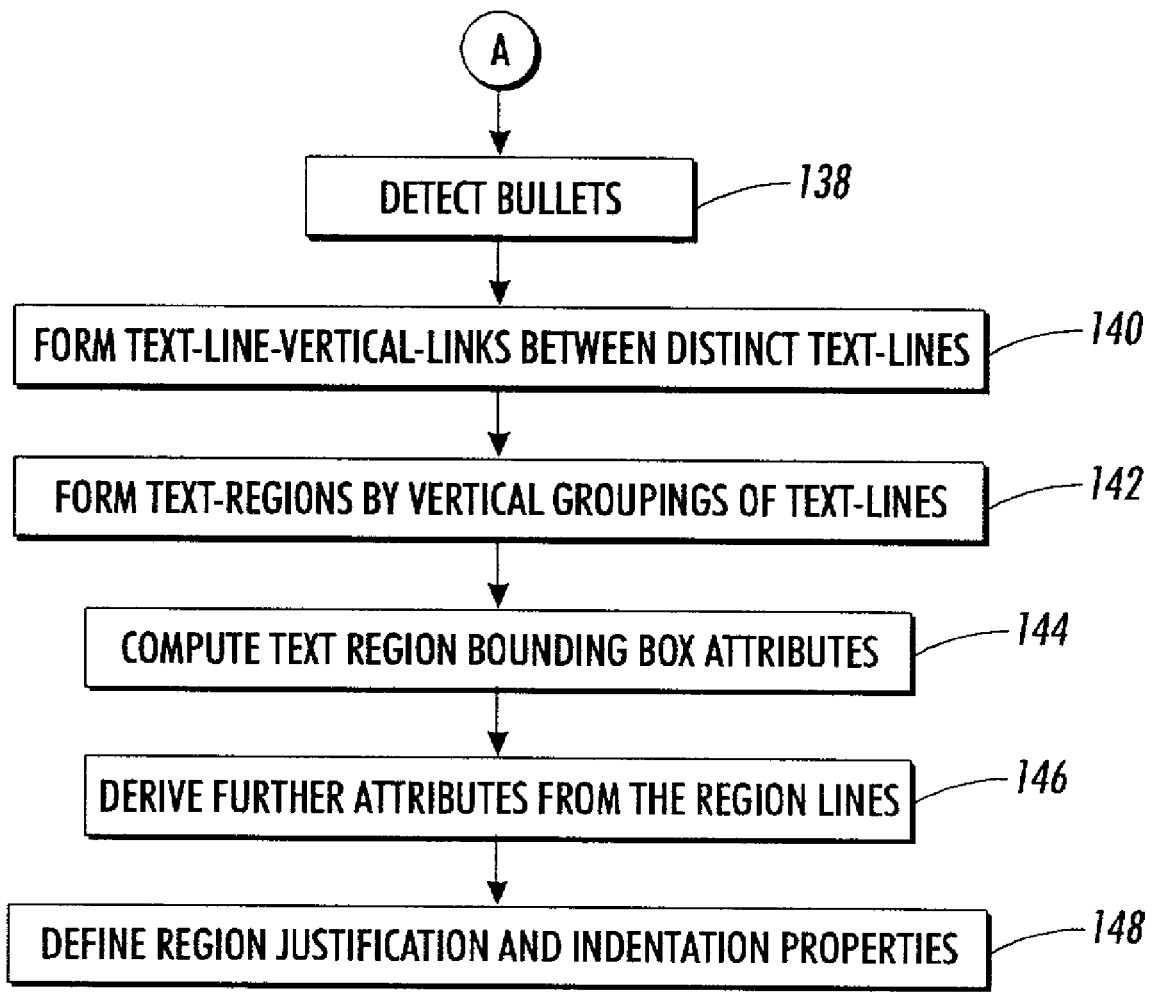

Provided below and illustrated in FIGS. 8A–8B is a procedure which may be used in one embodiment to detect collections of bitmap and stroke-fragment objects reflecting alternative perceptually significant interpretations of text structures 120. Input to the procedure is a binary image array (B) obtained by binarizing an original input array or alternatively by rendering small connected components and stroke fragments 122, found by the segmentation process previously described. The strategy of this process is to first identify image elements representing text, then build structures representing their spatial layout. Actual text recognition Optical Character Recognition (OCR) or Image Character Recognition (ICR) technologies are options that could be used by the process.

Once the input binary image array is input, the process moves to,

1. Detecting long horizontal lines by a fixed threshold on normalized total curvature of the bounding contours of connected components 124. These are removed from B (the binary image array) by subtraction, resulting in a new binary array B' 126. (Such lines are treated as separators, not as text.)
2. Defining stable groups of connected components in B' with respect to their bounding-box height 128. A component is then taken to be text if it is in the minimum height group (i.e., the group with ID=1, if group ID increases monotonically with the grouped attribute) 130. Techniques for defining stable groups are known in the art, one being described in the following reference: James V. Mahoney and Satyajit Rao, Analyzing An Image Or Other Data To Obtain A Stable Number Of Groups. U.S. Pat. No. 5,537,491, Issued July, 1996 hereby incorporated by reference.
3. Forming the following types of neighbor links among the text connected components that will later be used to define text lines and regions, which may be defined as,
    (i) A raw-link which is a Euclidean nearest neighbor link between pixels of different components.
    (ii) A text-link which is a raw-link joining pixels of two different text components. This is implemented by checking that the elements on both ends of a raw-link are in the same group. Thus all non-text components act as text separators.
    (iii) A horizontal-link which is a raw-link within 25 degrees of the horizontal.
    (iv) A vertical-link which is a raw-link within 25 degrees of the vertical.
4. Forming text-lines by horizontal grouping of connected components 134, which is accomplished by,
    (i) Defining stable groups of horizontal-links with respect to their distance attribute. A horizontal-link is also a proximity-link if it is in the minimum distance group.
    (ii) Forming text-line-links as text-links that are also horizontal-links and proximity-links.
    (iii) Forming text-lines by propagating labels over text-line-links through transitive closure (i.e., by coloring on the text line link graph).
5. Accumulating basic text line attributes by accumulating the basic text line attributes within each text line 136. These attributes include leftmost X, rightmost X, topmost Y, and bottommost Y, referring to the coordinates of the bounding box of the line. Other attributes computed from these basic ones are bounding box width, height, and center X.
6. Detecting bullets by applying simple constraints to connected components that are connected by text-line links 138. For example, a sufficiently compact component that is (a) the first-element of a multi-element line; and (b) the minimum height element of its text line which may be taken to be a bullet.
7. Forming text-line-vertical-links between distinct text-lines 140.
8. Forming text-regions by vertical grouping of text-lines 142, including,
    (i) Forming stable groups of text-line-vertical-links with respect to their distance attribute. A text-line-vertical-link is also a proximity-link if it is in the minimum distance group.
    (ii) Forming text-line-vertical-alignment-links as text-line-vertical-links between text lines that have some horizontal overlap.
    (iii) Forming text-region-links as vertical-links that combine the proximity and alignment constraints.
    (iv) Now text regions may be defined by transitive closure propagation over text region links (i.e., by coloring on the text region link graph) and the text line links.
9. Computing text region bounding box attributes by accumulating the attributes over each text region 144. Further attributes are then derived from the region's lines: maximum line height, total line height, and line count 146.
10. Based on the text line and region attributes, region justification (left, right, and center) and indentation properties are defined by known techniques.

Figure 9A:
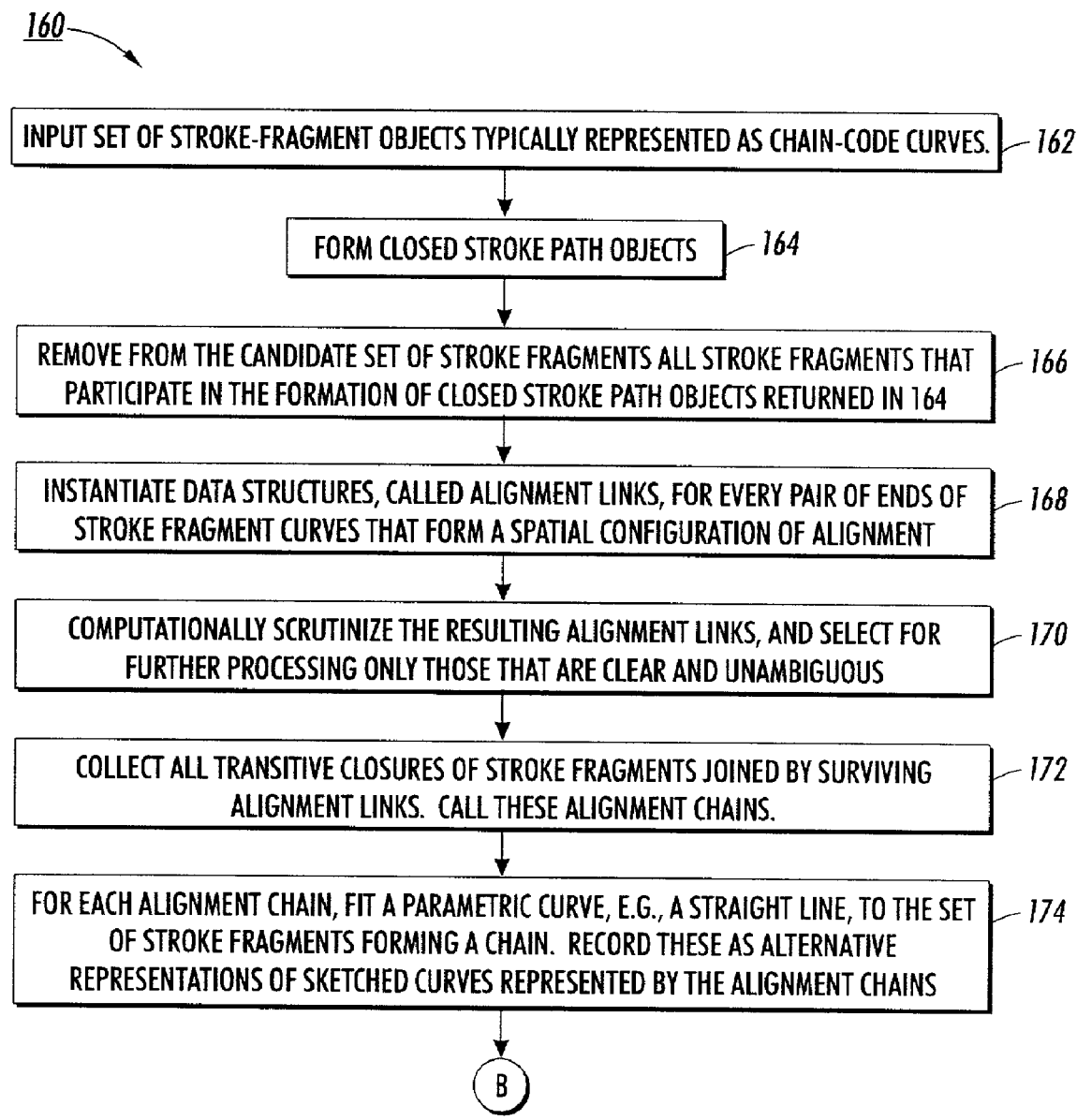
FIGS. 9A–9B is a flow diagram for detection of collections of stroke-fragment objects reflecting alternative perceptually significant interpretations of graphic objects.
Figure 9B:
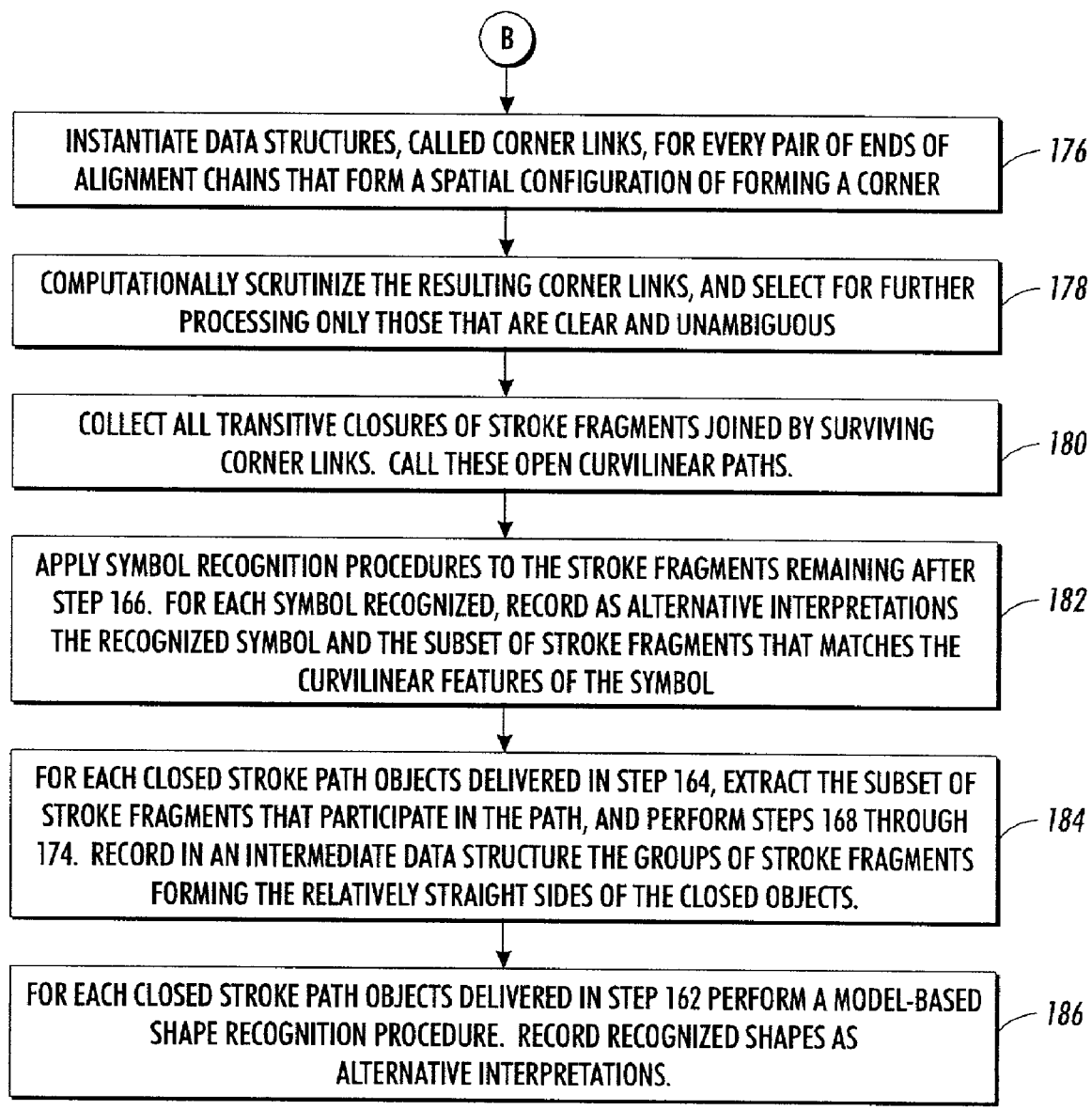
Figure 10A:
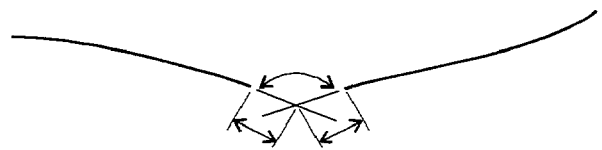
FIG. 10A illustrates measurements of curve alignments.
Figure 10B:
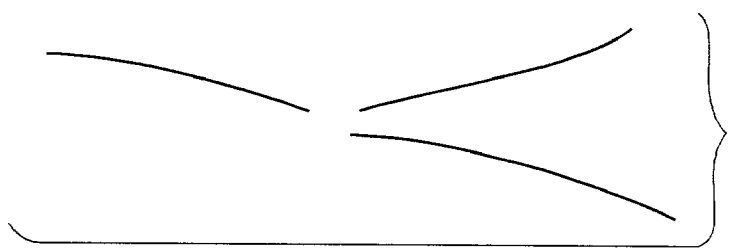
FIG. 10B depicts a configuration of strokes which do not exhibit a unique alignment relation.
Figure 11A:
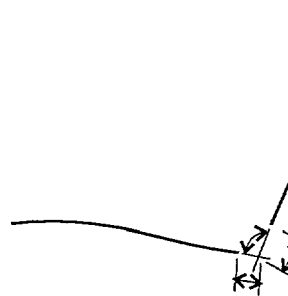
FIG. 11A depicts sample geometric measurements used to determine corner relations between two curvilinear strokes.
Figure 11B:
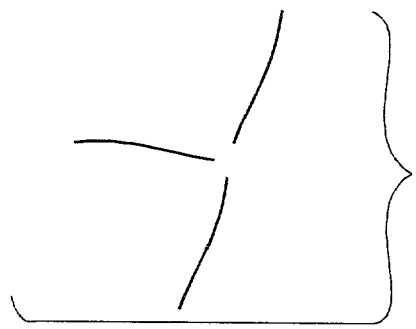
FIG. 11B illustrates a configuration where curvilinear strokes do not exhibit a unique corner relationship.

4.3. Image Analysis to Detect Alternative Interpretations of Line Art Objects This section sets forth a procedure, as illustrated in FIGS. 9A–9B, to detect collections of stroke-fragment objects reflecting alternative perceptually significant interpretations of graphic objects 160. Input to the procedure is a set of stroke-fragment objects typically represented as chain-code curves 162. The procedure further includes:

1. Forming closed stroke path objects 164. One example of forming closed stroke path objects is taught in Saund, E., "Finding Perceptually Closed Paths in Sketches and Drawings," POCV 2001: The Third Workshop on Perceptual Organization in Computer Vision, CIS Report\#CIS-2001-05, Center for Intelligent Systems, Technion, Israel (2001).
2. Removing from the candidate set of stroke fragments all stroke fragments that participate in the formation of closed stroke path objects returned in Step 164, 166.
3. Instantiating data structures, called alignment links, for every pair of ends of stroke fragment curves that form a spatial configuration of alignment 168. Such measurement of curve alignments are well known in the art. FIG. 10A provides an illustration of sample geometric measurements used to determine an alignment relation between two curvilinear strokes.
4. Computationally scrutinizing the resulting alignment links, and selecting for further processing only those that are clear and unambiguous 170. FIG. 10B shows a configuration of strokes which do not exhibit a unique alignment relation.
5. Collecting all transitive closures of stroke fragments joined by surviving alignment links, which may be called alignment chains 172.
6. For each alignment chain, a parametric curve is fitted (e.g., a straight line) to the set of stroke fragments forming the chain 174. These are then recorded as alternative interpretations of the sketched curves represented by the alignment chains.
7. Instantiating data structures, which may be called corner links, for every pair of ends of alignment chains that form a spatial configuration of forming a corner 176. An example of this is set forth by FIG. 1A, which shows sample geometric measurements used to determine corner relations between two curvilinear strokes. Processes to measure such corner formations are well known in the art.
8. Computationally scrutinizing the resulting corner links, and selecting for further processing only those that are clear and unambiguous 178 (FIG. 11B provides an example of a configuration where the curvilinear strokes do not exhibit a unique corner relationship.).
9. Collecting all transitive closures of stroke fragments joined by surviving corner links, these links may be identified as open curvilinear paths 180.
10. Applying symbol recognition procedures to the stroke fragments remaining after Step 166 (182). For Step 182, many suitable symbol recognition procedures are available in the art. For each symbol recognized, the recognized symbol and the subset of stroke fragments that matches the curvilinear features of the symbol are recorded as alternative interpretations .
11. For each closed stroke path object delivered in Step 164, extracted are the subset of stroke fragments that participate in the path, then Steps 168 through 174 are performed. Thereafter recorded in an intermediate data structure are the groups of stroke fragments forming the relatively straight sides of the closed objects 184.
12. For each closed stroke path object delivered in Step 164, a model-based shape recognition procedure is performed to detect whether the closed stroke path object forms a known shape such as a rectangle or ellipse 186. Shape recognition algorithms are available and well known in the art for this purpose. Any recognized shapes are then recorded as alternative interpretations of the closed path object.

4.4. Constructing the Alternative Graph of Text and Line Art Objects

Figure 12A:
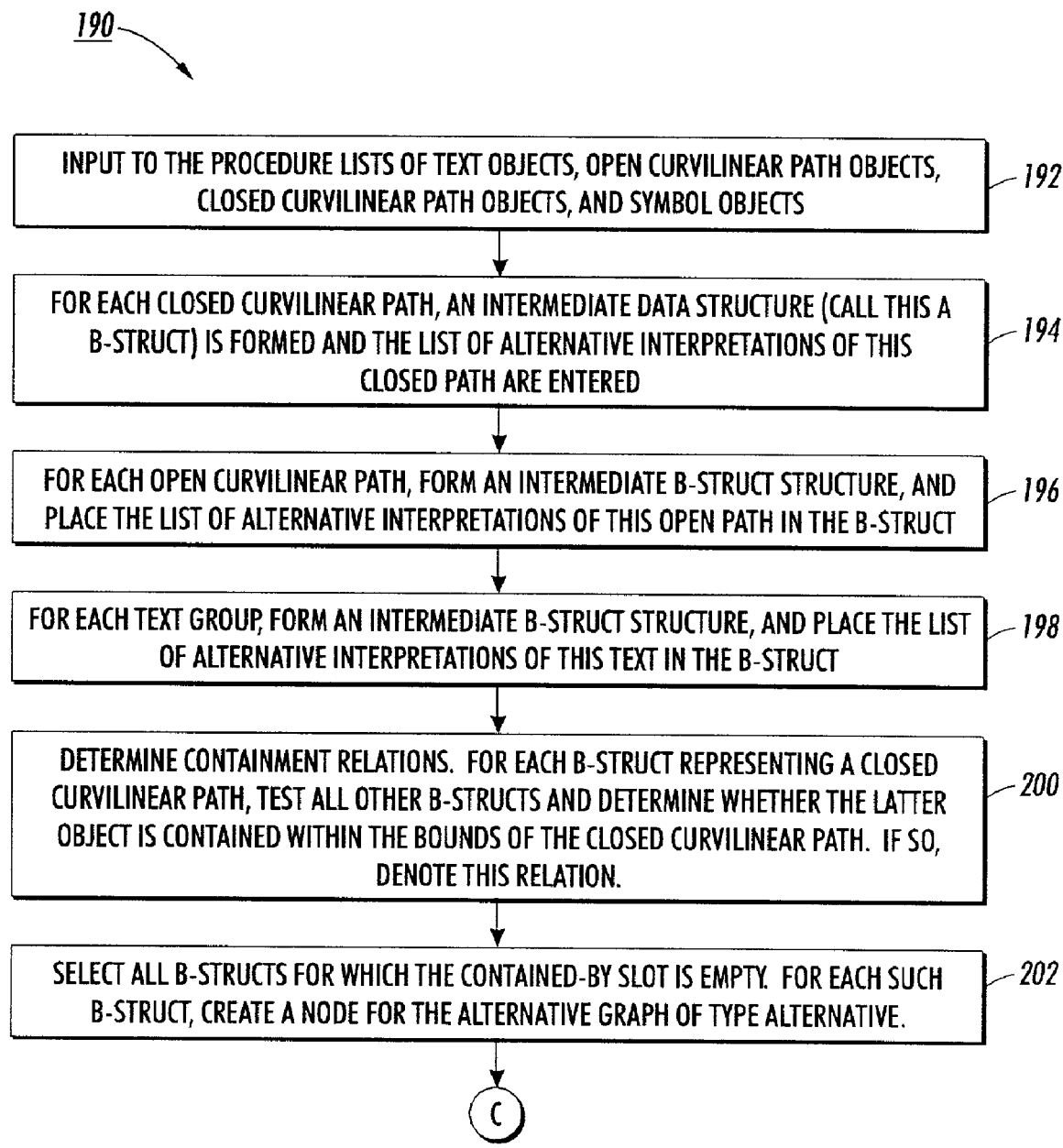
FIGS. 12A and 12B set forth a flow diagram for constructing an alternative graph of text and line art objects.
Figure 12B:
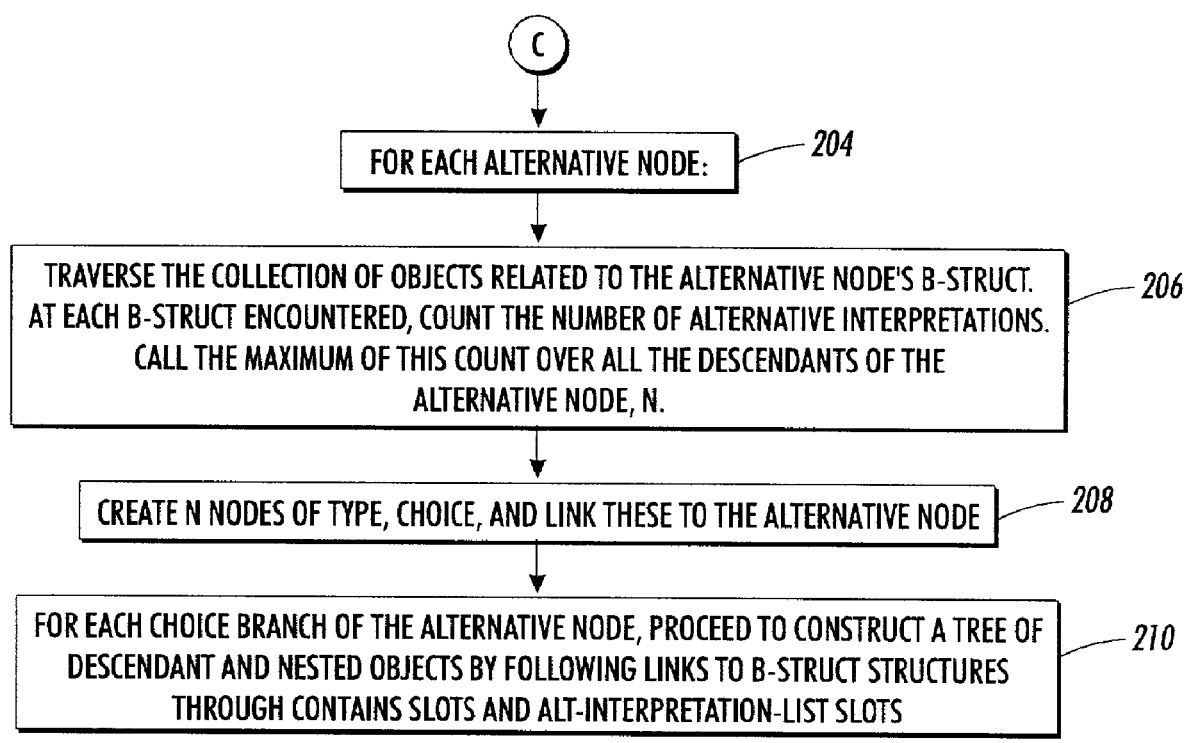

This section describes and illustrates, in FIGS. 12A–12B, a procedure 190 for constructing an Alternative Graph (such as the Alternative Graph 60 of FIG. 5) which stands as an intermediate data structure to facilitate aggregation of individually recognized text and line-art objects, each with potentially several alternative interpretations, into a unified representation that can readily be exported to structured text/graphics editors. Input to the procedure are lists of text objects, open curvilinear path objects, closed curvilinear path objects, and symbol objects 192. Each object in these lists include multiple perceptual interpretations. The Alternative Graph is used to organize these multiple perceptual interpretations so that they may be made available to users in a coherent and integrated fashion.

The procedure 190 described is one embodiment of the system in which the Alternative Graph constructed contains ALTERNATIVE nodes only at the root level. This is suited for presentation of alternative interpretations as multiple slides in Powerpoint, MacDraw or other editing systems. Construction of more general Alternative Graphs, in which ALTERNATIVE nodes occur throughout the tree, is a simplification of this procedure. Such more general Alternative Graphs would be suited to other presentation modes such as object-by-object display and selection among alternatives.

Procedure:

1. For each closed curvilinear path, form an intermediate data structure (call this a B-struct; B-struct is an arbitrary designation for this structure) 194. The B-struct has data slots identified as: alt-interpretations-list, contains, contained-by. Into the alt-interpretations-list slot, place the list of alternative interpretations of this closed path (e.g., the list of stroke-fragments comprising the path; the mathematical representation for a rectangle fit to the stroke-fragments; and the mathematical representation for an ellipse fit to the stroke-fragments).
2. For each open curvilinear path, an intermediate B-struct structure is formed and, into the alt-interpretations-list slot, place the list of alternative interpretations of this open path 196 (e.g., the list of stroke-fragments comprising the path; a group of stroke-fragments comprising the path plus arrowheads associated with the path; and a parametric approximation to the path's shape).
3. For each text group, an intermediate B-struct structure is formed, and into the alt-interpretations-list slot, place the list of alternative interpretations of this text group 198 (e.g., the simple group of bitmap objects and stroke fragments; a representation for an indented list).
4. Determine containment relations. For each B-struct representing a closed curvilinear path, test all other B-structs and determine whether the latter object is contained within the bounds of the closed curvilinear path. If so, denote this relation by cross referencing B-structs' identities using the contains and contained-by slots 200.
5. Select all B-structs for which the contained-by slot is empty For each such B-struct, create a node for the Alternative Graph of type ALTERNATIVE 202.

Figure 13:
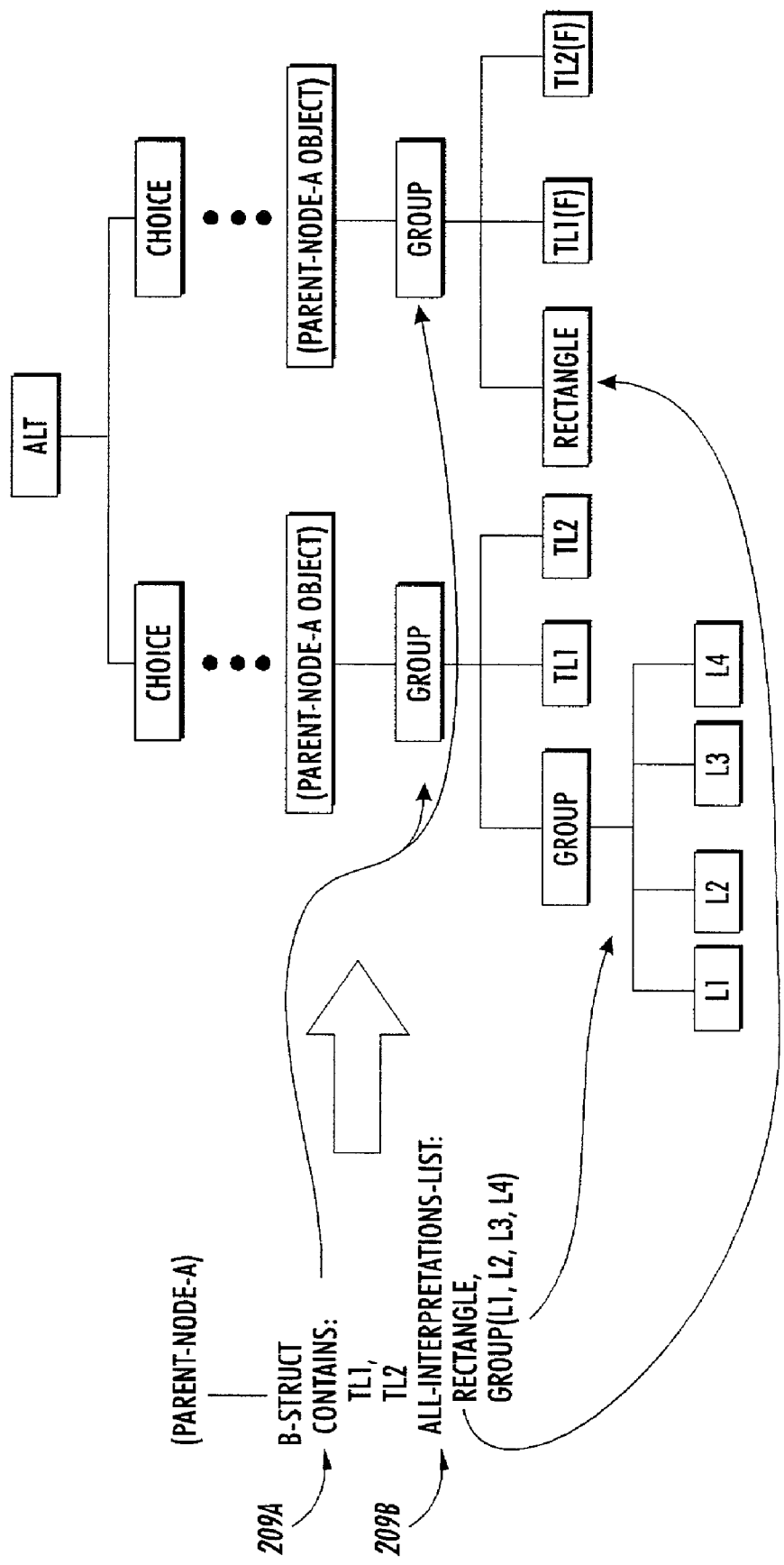
FIG. 13 is an alternative graph which may in part configured in accordance with the flow of FIGS. 12A–12B.

6. For each Alternative node 204 perform the following steps:
   6a. Traverse the collection of objects related to the Alternative node's B-struct by exhaustively following pointers in the B-struct's alt-interpretations-list slot and contains slot. At each B-struct encountered, count the number of alternative interpretations. Call the maximum of this count over all descendents of the Alternative node, N, 206.
   6b. Create N nodes of type, CHOICE, and link these to the Alternative node 208.
   6c. For each choice branch of the Alternative node, proceed to construct a tree of descendent and nested objects by following links to B-struct structures through contains slots (209*a* of FIG. 13) and alt-interpretation-list slots (209B of FIG. 13), as follows:
      (i) If a contains slot is found to be non-empty, then form a node of type GROUP. Link this group node to the parent node from which this B-struct was encountered.
      (ii) Choose one member of the alt-interpretation-list which will represent this graphic object in this Choice branch of this root Alternative node. Typically the interpretation chosen will be in accordance with properties of other interpretations of this Choice branch. For example, one Choice branch will prefer to treat curvilinear paths as simple groups of stroke-fragments, while another Choice branch will prefer to treat them as their formal graphic object interpretations such as straight line, polygon, rectangle, or conic parametric approximations.
      (iii) If the interpretation chosen is represented by a list of stroke fragment or bitmap objects, then from a node of type GROUP and record the stroke fragments in the group's member list. If a group node has been formed due to the B-slot's contains list, then link this group as a subordinate to that one, 210.

4.5. Exporting to a Structured Graphics Editor

Using the Alternative Graph, presentation slides are created in a structured text/graphics editor using particular protocols and means depending on the software APIs available for that editor software program, and depending on the desired alternative interpretation presentation format.

Figure 14:
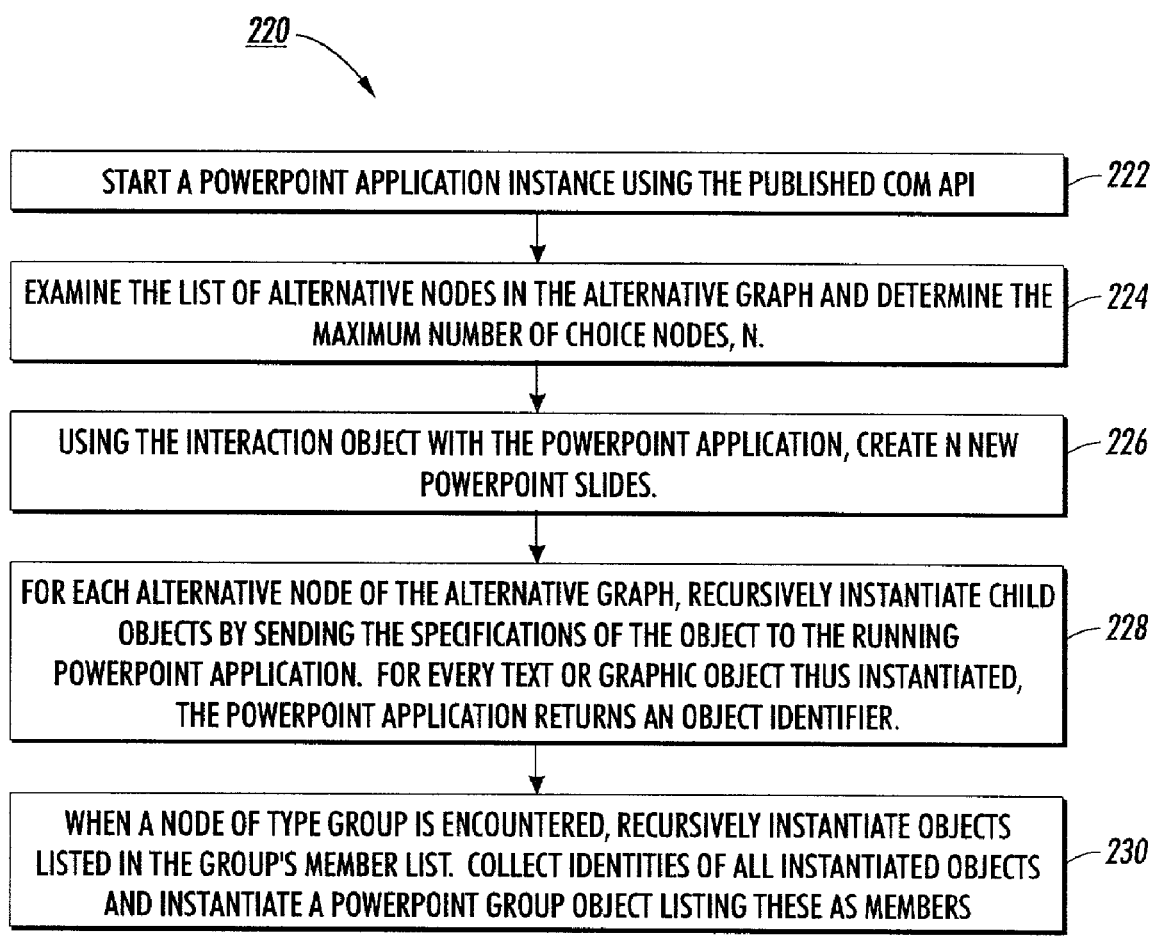
FIG. 14 illustrates a procedure for exporting an alternative graph to a structured text/graphics editor.

As an example, and as depicted in FIG. 14, the following discloses a procedure 220 for exporting the Alternative Graph to a structured text/graphics editor (i.e., Powerpoint or other editor) as multiple interpretation slides.

1. Start a structured text/graphics editor application instance using the published COM API, 222.
2. Examine the list of Alternative nodes in the Alternative Graph and determine the maximum number of Choice nodes, N 224.
3. Using the interaction object with the editor application, create N new slides 226.
4. For each Alternative node of the Alternative Graph, recursively instantiate child objects by sending the specifications of the object to the running editor application. For every text or graphic object thus instantiated, the editor application returns an object identifier 228.
5. When a node of type GROUP is encountered, recursively instantiate objects listed in the group's member list. Collect identities of all instantiated objects and instantiate a group object listing these as members 230.

The preceding description merely provides a disclosure of particular embodiments of the invention and is not intended for the purpose of limiting the same thereto. As such, the invention is not limited to only the above-described embodiments. Rather, it is recognized that one skilled in the art could conceive alternative embodiments that fall within the scope of the invention.

What is claimed is:

1. An image analysis and conversion method comprising:
   receiving a digital ink image having both text and line art; and
   converting the digital ink image into multiple structured object representations of the digital ink image, the multiple structured object representations representing at least a first image representation having formal structured object representations, and a second image representation containing informal structured object representations, each of the structured object representations correlating to a defined perceptually salient structure of the digital ink image, each perceptually salient structure including text and line art, wherein each of the structured object representations is editable by a structured text/graphics editor, and
   altering the digital ink image into multiple simultaneously existing structured alternative interpretations of the digital ink image each of the alternative interpretations being plausible intended outputs of a user.

2. The method according to claim 1 wherein the step of converting the digital ink image into structured object representations of the digital ink image includes configuring the structured object representations to represent an electronic slide of the structured text/graphics editor.

3. The method according to claim 1, wherein the converting step includes forming of an Alternative graph, wherein the Alternative Graph is configured for the generation of the plurality of simultaneously existing, structured alternative interpretations of the digital ink image, configured to permit movement of the structured object representation as at least one of individual structured object representations, and a sub-group of all the structured object representations or as an overall group of the structured object representations.

4. The method according to claim 3 wherein forming of an Alternative Graph includes:
   forming for each of a number of closed curvilinear paths, a first intermediate data structure, and placing in the first intermediate data structure a list of alternative interpretations of the closed curvilinear paths;
   forming for each of a number of open curvilinear paths, a second intermediate structure, and placing in the second intermediate data structure a list of alternative interpretations of the open paths;
   forming for text of a number of text groups, a third intermediate data structure, and placing in the third intermediate data structure, a list of alternative interpretations of the text;
   determining spatial containment relations, for each intermediate data structure representing the closed curvilinear paths;
   testing all other intermediate data structures and determining whether an object is spatially contained within the bounds of each of the closed curvilinear paths and, if so, denoting this relation in a contained-by slot of the intermediate data structure;
   selecting all structures for which a contained-by slot of the intermediate data structures is empty;
   creating an Alternative node for the Alternative Graph for each intermediate data structure for which the contained-by slot is empty; and for each Alternative node, performing the steps of,
traversing a collection of objects related to the Alternative node,
counting at each intermediate data structure encountered a number of alternative interpretations of the objects.
defining, as N, a maximum of this count over all descendents of the Alternative node,
creating N nodes of a type, CHOICE,
linking the CHOICE type nodes to the Alternative node, and
constructing, for each choice branch of the Alternative node, a tree of descendent and nested objects.

5. The method according to claim 1 wherein the editing by the structured text/graphics editor permits movement of structured object representations by at least one of, individual objects, a sub-group of all the structured object representations, or as an overall group of the structured object representations.

6. The method according to claim 1 wherein the digital ink image is converted into the structured objects representations of the digital ink image through the use of an Alternative Graph.

7. The method according to claim 6
wherein forming of an Alternative Graph includes:
forming for each of a number of closed curvilinear paths, a first intermediate data structure, and placing in the first intermediate data structure a list of alternative interpretations of the closed curvilinear paths;
forming for each of a number of open curvilinear paths, a second intermediate structure, and placing in the second intermediate data structure a list of alternative interpretations of the open paths;
forming for text of a number of text groups, a third intermediate data structure, and placing in the third intermediate data structure, a list of alternative interpretations of the text;
determining spatial containment relations, for each intermediate data structure representing the closed curvilinear paths;
testing all other intermediate data structures and determining whether an object is spatially contained within the bounds of each of the closed curvilinear paths and, if so, denoting this relation in a contained-by slot of the intermediate data structure;
selecting all structures for which a contained-by slot of the intermediate data structures is empty;
creating an Alternative node for the Alternative Graph for each intermediate data structure for which the contained-by slot is empty; and
for each Alternative node, performing the steps of,
traversing a collection of objects related to the Alternative node,
counting at each intermediate data structure encountered a number of alternative interpretations of the objects,
defining, as N, a maximum of this count over all descendents of the Alternative node,
creating N nodes of a type, CHOICE,
linking the CHOICE type nodes to the Alternative node, and
constructing, for each choice branch of the Alternative node, a tree of descendent and nested objects.

8. An image analysis and conversion system comprising:
an image receiving input designed to receive a digital ink image having both text and line art; and
a converter configured to convert the digital ink image into structured object representations of the digital ink image, each of the structured object representations correlating to a perceptually salient structure of the digital ink image defined by the converter, each perceptually salient structure including text and line art, wherein each of the structured object representations is editable by a structured text/graphics editor and the converter further configured to alter the digital ink image into multiple simultaneously existing structured alternative interpretations of the digital ink image, each of the alternative interpretations being plausible intended outputs of a user.

9. The system according to claim 8 wherein when the converter converts the digital ink image to the structured object representations of the digital ink image, the structured object representations are in the form of at least one of formal structured objects and informal structured objects.

10. The image analysis and conversion system according to claim 9 wherein the converter includes,
an image processing and segmentation module, which identifies classes of primitive image objects, including at least one of (i) small connected components at the scale of text characters, and (ii) substantially straight curvilinear line fragments uncomplicated by junctions, called stroke-fragments;
a text identification and layout analysis module which identifies groupings of the stroke objects representing runs of text characters forming text lines and columns, to generate a list of text group structures, each containing two or more alternative interpretations of the text groups;
a line art analysis module, which identifies groupings of stroke objects, to generate a list of line art group objects, each containing two or more alternative interpretations of the line art objects;
a construction of alternative graph module, which takes as input the lists of text and line art groups including alternative interpretations for each group, and constructs an Alternative Graph; and
an export to structured graphics editor module, which traverses the alternative graph and creates presentation slides with text and line art objects, and a hierarchy of groups.

11. On a screen display of an electronic device operating a structured text/graphics editor, an image representation comprising:
structured object representations of a digital ink image, each structured object representation correlating to an automatically defined perceptually salient area of the digital ink image, wherein each of the structured object representations is editable by the structured text/graphics editor to allow a user to generate multiple alternative interpretations of the digital ink image, the multiple alternative interpretations being simultaneously existing structured alternative interpretations of the digital ink image, each of the alternative interpretations being plausible intended outputs of a user.

12. The image representation according to claim 11 wherein the structured object representations are informal structured object representations, and formal structured object representations.

13. The image representation according to claim 12 wherein the alternative interpretations permit a mixing of the formal structured object representations and the informal structured object representations in a single image representation.

14. The image representation according to claim 11 wherein a first structured object representation is spatially contained within a second structured object representation.

15. The image representation according to claim 11 wherein a new structured object representation is added to existing structured object representations.

16. The image representation according to claim 11 wherein the structured object representations define a text block structure.

17. The image representation according to claim 16 wherein the text block structure includes a display of text parameters including at least one of text layout, text font, bullets, underlines and dummy characters.

18. The image representation according to claim 17 wherein the dummy characters are replaceable with target characters.

19. The image representation according to claim 11 wherein distinct alternative interpretations may be displayed at the same time.

20. The image representation according to claim 19 wherein display of the alternative interpretations is accomplished by the use of at least one of underlays, bubble or balloon images, coloring, shading transparency/translucency, defocusing, and pop-up windows.

* * * * *